US012608069B2

(12) United States Patent
Chu et al.

(10) Patent No.: US 12,608,069 B2
(45) Date of Patent: Apr. 21, 2026

(54) USER INPUT DEVICE DIAGNOSTICS

(71) Applicant: Dell Products L.P., Round Rock, TX (US)

(72) Inventors: Tao-Peng Chu, Taipei (TW); Naveen Kumar Ramakrishna, Round Rock, TX (US); Chen Hsin Chang, Keelung (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/751,575

(22) Filed: Jun. 24, 2024

(65) Prior Publication Data

US 2025/0390158 A1 Dec. 25, 2025

(51) Int. Cl.
| | |
|---|---|
| *G06F 11/00* | (2006.01) |
| *G06F 1/3231* | (2019.01) |
| *G06F 11/07* | (2006.01) |
| *G06F 11/22* | (2006.01) |

(52) U.S. Cl.
CPC ........ *G06F 1/3231* (2013.01); *G06F 11/0772* (2013.01); *G06F 11/2221* (2013.01)

(58) Field of Classification Search
CPC . G06F 1/3231; G06F 11/0772; G06F 11/3041
See application file for complete search history.

(56) References Cited

U.S. PATENT DOCUMENTS

| | | | | |
|---|---|---|---|---|
| 5,933,614 A | * | 8/1999 | Tavallaei | ............ G06F 11/3495 |
| | | | | 714/E11.201 |
| 2021/0034792 A1 | * | 2/2021 | Clark | ...................... G06F 21/83 |

* cited by examiner

*Primary Examiner* — Philip Guyton
(74) *Attorney, Agent, or Firm* — Fogarty LLP

(57) ABSTRACT

Embodiments provide diagnostic operations on user input devices of an Information Handling System (IHS). Sensor capabilities of the IHS are used to detect when a user of the IHS is not in proximity to the IHS. Upon detecting when the user is not in proximity to the IHS, monitoring is initiated for inputs detected by one or more of the user input devices of the IHS. When the monitoring detects an input to a first user input device while the user is not in proximity to the IHS, diagnostics are initiated to identify whether the detected input is a spurious event, or results from a fault in the first user input device. The diagnostics are exited upon detecting the user in proximity to the IHS and faults identified by the diagnostics are reported to the user.

20 Claims, 4 Drawing Sheets

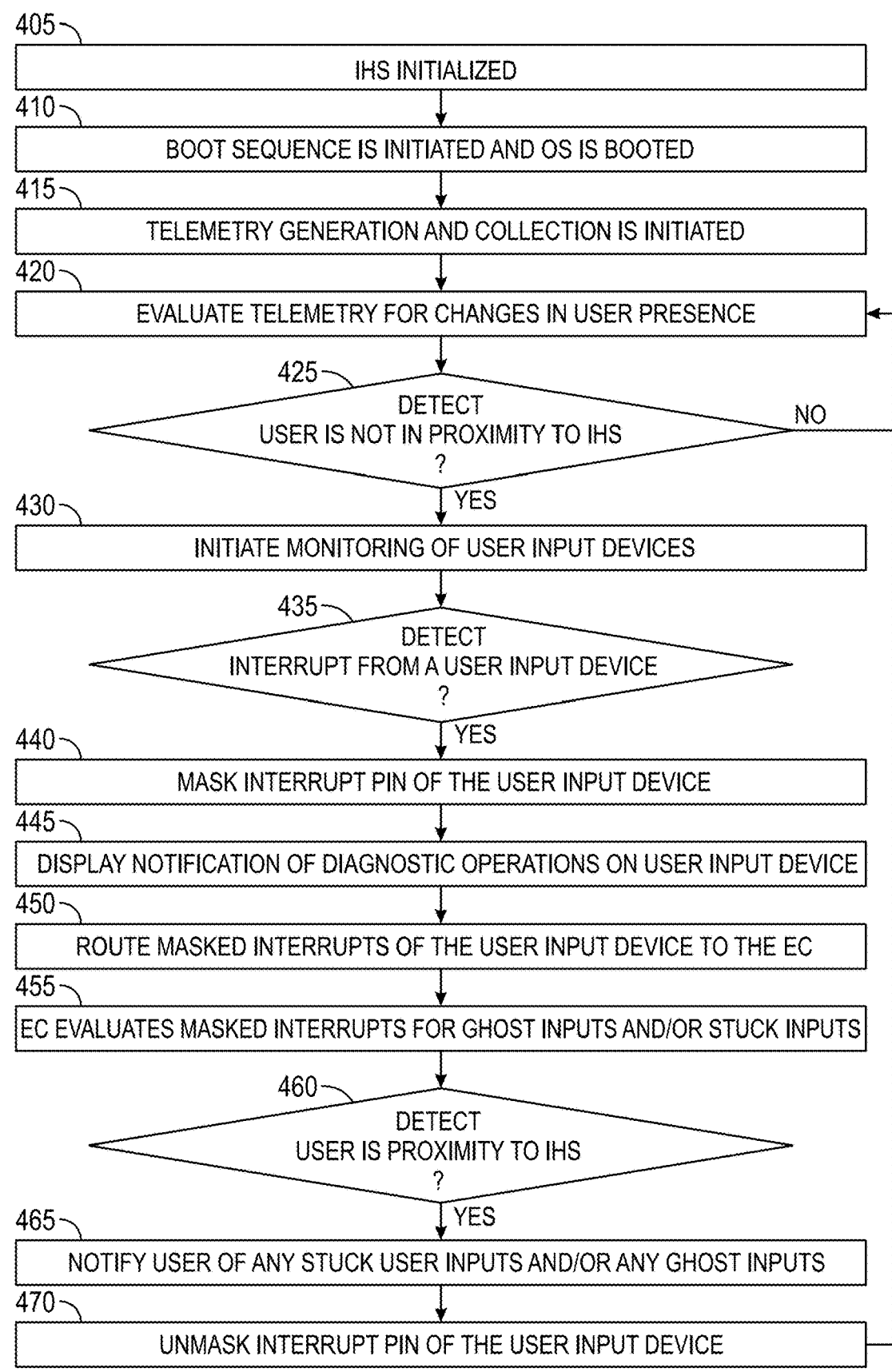

405 — IHS INITIALIZED

410 — BOOT SEQUENCE IS INITIATED AND OS IS BOOTED

415 — TELEMETRY GENERATION AND COLLECTION IS INITIATED

420 — EVALUATE TELEMETRY FOR CHANGES IN USER PRESENCE

425 — DETECT USER IS NOT IN PROXIMITY TO IHS ? — NO

YES

430 — INITIATE MONITORING OF USER INPUT DEVICES

435 — DETECT INTERRUPT FROM A USER INPUT DEVICE ?

YES

440 — MASK INTERRUPT PIN OF THE USER INPUT DEVICE

445 — DISPLAY NOTIFICATION OF DIAGNOSTIC OPERATIONS ON USER INPUT DEVICE

450 — ROUTE MASKED INTERRUPTS OF THE USER INPUT DEVICE TO THE EC

455 — EC EVALUATES MASKED INTERRUPTS FOR GHOST INPUTS AND/OR STUCK INPUTS

460 — DETECT USER IS PROXIMITY TO IHS ?

YES

465 — NOTIFY USER OF ANY STUCK USER INPUTS AND/OR ANY GHOST INPUTS

470 — UNMASK INTERRUPT PIN OF THE USER INPUT DEVICE

FIG. 4

USER INPUT DEVICE DIAGNOSTICS

FIELD

This disclosure relates generally to Information Handling Systems (IHSs), and more specifically, to diagnostics for user input devices of IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may support a variety of devices by which users of an IHS may provide inputs to applications operating on the IHS. In some instances, such user input devices of an IHS may be referred to as a Human Interface Device (HID). In some instances, spurious events or contact with the IHS by something other than the user may be registered as inputs by a user input device. These false inputs to an HID, such as a touchpad or touchscreen of an IHS, may be referred to as a "ghost" touches or inputs. In other instances, inputs registered by HIDs may include inputs that result from a specific input of an HID being stuck in specific position or setting, such as a stuck key of a keyboard or a stuck mouse button.

Such inadvertent HID inputs may result in unintended and unwanted IHS operations, such as prematurely sending an email or unintentionally closing or opening a program or file. As a result of such unwanted inputs, the user experience may be diminished while also substantially increasing use of IHS resources, such as by causing the IHS to retrieve a program from a hard drive, to load the program or file to memory, and to begin executing the program using the IHS processor. IHS operations resulting from stuck HID inputs, such as stuck keys, may result in a substantial load on the processor of an IHS due to the processor handling interrupts generated by the stuck HID inputs, thus causing lags in the IHS operations.

SUMMARY

In embodiments, system and methods provide diagnostic operations on user input devices of an Information Handling System (IHS). Embodiments may include: detecting when a user of the IHS is not in proximity to the IHS; when the user is not in proximity to the IHS, monitoring for inputs detected by one or more of the user input devices of the IHS; when the monitoring detects an input to a first user input device while the user is not in proximity to the IHS, initiating diagnostics to identify whether the detected input is a spurious event or results from a fault in the first user input device; and exiting the diagnostics upon detecting the user in proximity to the IHS, wherein faults identified by the diagnostics are reported to the user.

In some embodiments, the user is detected not in proximity to the IHS comprises determining when the user is too far from the IHS to provide inputs to the one or more user input devices. In some embodiments, the user is detected in proximity to the IHS based on telemetry collected from one or more sensors of the IHS. In some embodiments, the user input devices touchpad, a touchscreen, a keyboard and a mouse. In some comprise at least one of: a embodiments, the diagnostics comprise masking interrupts generated by the first user input device while the user is not proximity to the IHS. In some embodiments, the masking of interrupts generated by the first user input device while the user is not proximity to the IHS comprises routing of the interrupts to an embedded controller of the IHS. In some embodiments, the masked interrupts that are routed to the embedded controller are not received by a system processor of the IHS. In some embodiments, the embedded controller implements the diagnostics that identify whether the detected input is a spurious event or results from a fault in the first user input device. In some embodiments, the embedded controller identifies whether the detected input results from a fault in the first user input device by determining an input of the first input device is in a stuck state. In some embodiments, the embedded controller determining an input of the first input device is in a stuck state based on the inputs detected in the masked interrupts routed to the embedded controller. In some embodiments, the embedded controller identifies whether the detected input is a spurious event based on the input not reoccurring in the masked inputs routed to the embedded controller. Some embodiments further include notifying the user of the diagnostics initiated on the first user input device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is a flowchart illustrating an example of a method for supporting diagnostics of user input devices coupled to an IHS, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail with regard to FIG. 1.

Figure 1:
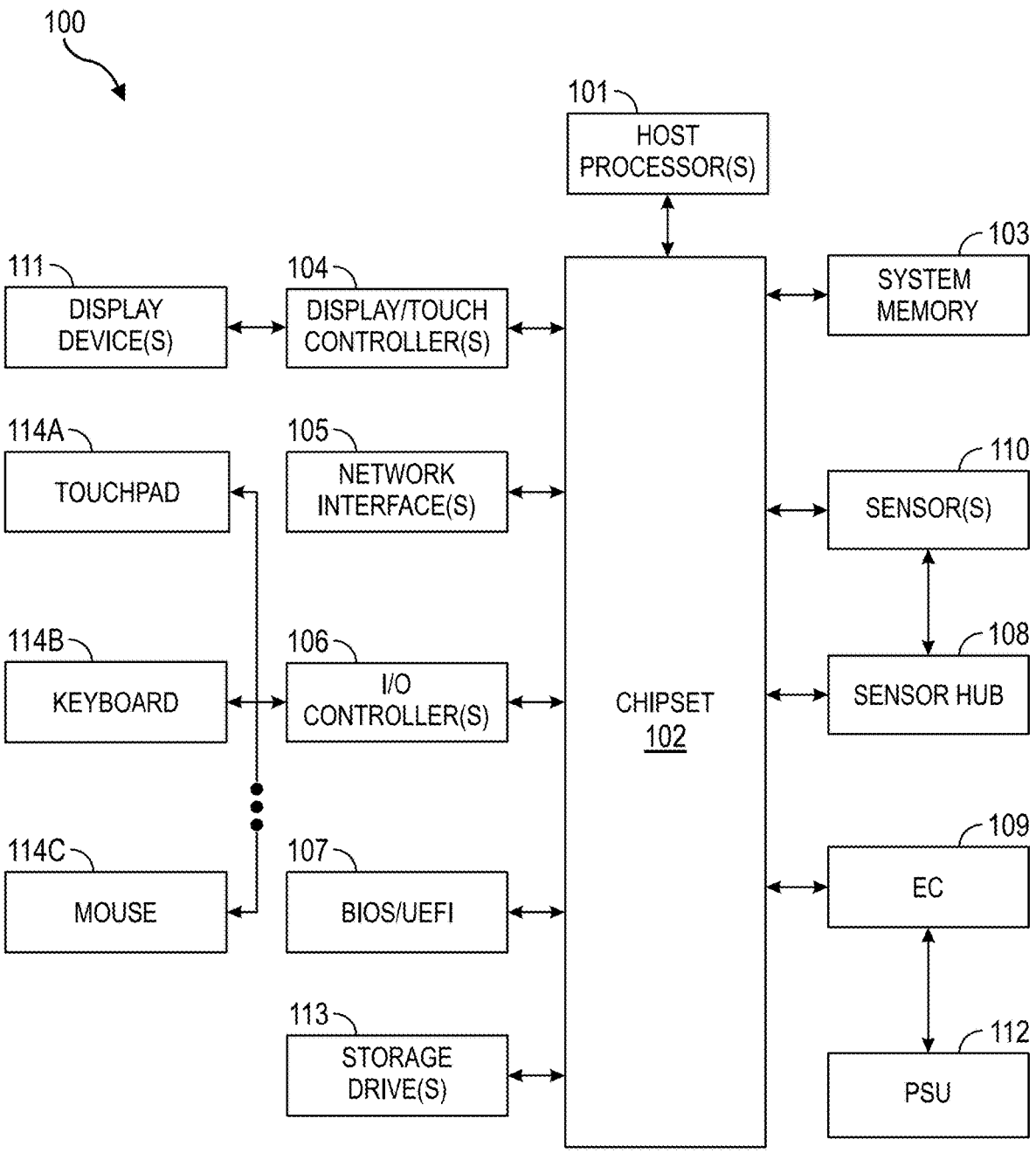
FIG. 1 is a diagram illustrating examples of components of an Information Handling System (IHS) configured, according to some embodiments, to support diagnostics of user input devices coupled to the IHS.

FIG. 1 is a diagram illustrating examples of components of an Information Handling System (IHS) 100 configured, according to some embodiments, to support diagnostics of user input devices coupled to the IHS. In some embodiments, IHS 100 may be a laptop computer with one or more integrated user input devices, such as an integrated touchscreen and keyboard. In some embodiments, IHS 100 may additionally utilize peripheral user input devices, such as an external keyboard and/or mouse. As described in additional detail below, in embodiments, IHS 100 may be configured to support diagnostics of such user input devices that are coupled to the IHS, in particular diagnostics that are triggered based on the detection of inputs by these user inputs devices despite the user of the IHS not being in physical proximity to the IHS.

As illustrated, IHS 100 includes host processor(s) 101. In various embodiments, IHS 100 may be a single-processor system, a multi-processor system including two or more processors and/or processor cores. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.). IHS 100 utilizes a chipset 102 that may include one or more integrated circuits that are connected to processor 101. In the embodiment of FIG. 1, processor 101 is depicted as separate component from chipset 102. In other embodiments, all of chipset 102, or portions of chipset 102 may be implemented directly within the integrated circuitry of the processor 101. Chipset 102 provides the processor(s) 101 with access to a variety of resources of the IHS.

In some embodiments, processor 101 may include an integrated memory controller that may be implemented directly within the circuitry of the processor 101, or the memory controller may be a separate integrated circuit that is located on the same die as the processor 101. The memory controller may be configured to manage the transfer of data to and from the system memory 103 of the IHS 100 via a high-speed memory interface. The system memory 103 provides the processor 101 with a high-speed memory that may be used in the execution of computer program instructions by the processor 101. Accordingly, system memory 103 may include memory components, such as such as static RAM (SRAM), dynamic RAM (DRAM), NAND Flash memory, suitable for supporting high-speed memory operations by the processor 101. In certain embodiments, system memory 103 may combine both persistent, non-volatile memory and volatile memory. In certain embodiments, the system memory 103 may be comprised of multiple removable memory modules.

As illustrated, a variety of resources may be coupled to the processor(s) 101 of the IHS 100 through the chipset 102.

For instance, chipset 102 may be coupled to a network interface 105 that may support different types of network connectivity. In certain embodiments, IHS 100 may include one or more Network Interface Controllers (NICs), each of which may implement the hardware required for communicating via a specific networking technology, such as Wi-Fi, BLUETOOTH, Ethernet and mobile cellular networks (e.g., CDMA, TDMA, LTE). In various embodiments, network interface 105 may support network connections by wired network controller(s) and/or wireless network controller(s).

Chipset 102 also provides processor 101 with access to one or more storage drives 113. In various embodiments, storage drives 113 may be integral to the IHS, or may be external to the IHS 100. In some embodiments, storage drive(s) 113 may be accessed via a storage controller that may be an integrated component of the storage device. In some embodiments, a storage controller may be a system-on-chip function of processor(s) 101. Storage drive(s) 113 may be implemented using any memory technology allowing IHS 100 to store and retrieve data. For instance, storage drive(s) 113 may be a magnetic hard disk storage drive or a solid-state storage drive. In certain embodiments, storage drive(s) 113 may include a system of storage devices, such as a cloud drive accessible via network interface 105.

As illustrated, IHS 100 also includes a BIOS (Basic Input/Output System) 107 that may be stored in a non-volatile memory accessible by chipset 102. In some embodiments, BIOS 107 may be implemented using a dedicated microcontroller coupled to the motherboard of IHS 100. In some embodiments, BIOS 107 may be implemented as operations of embedded controller 109. Upon powering or restarting IHS 100, processor(s) 101 may utilize BIOS 107 instructions to initialize and test hardware components coupled to the IHS 100. The BIOS 107 instructions may also load an operating system for use by the IHS 100. The BIOS 107 provides an abstraction layer that allows the operating system to interface with certain hardware components of the IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI.

In various embodiments, one or more display devices 111 may be coupled to IHS 100. Display device(s) 111 may include a plurality of pixels that are arranged in a matrix and are configured to display visual information. Display device(s) 111 may include Liquid Crystal Display (LCD), Light Emitting Diode (LED), organic LED (OLED), or other thin film display technologies. IHS 100 may support an integrated display device, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays, such as external monitors that may be coupled to IHS 100 via various types of couplings. In some embodiments, chipset 102 may provide access to one or more display device(s) 111 via a graphics processor and/or GPU (Graphics Processor Unit). In certain embodiments, a graphics processor may be comprised within a video or graphics card or within an embedded controller installed within IHS 100. In certain embodiments, a graphics processor may be integrated within processor 101, such as a component of a system-on-chip.

In some embodiments, one or more of the display devices 111 may be capable of receiving touch inputs from a user. In some embodiments, these touch inputs received via display devices 111 may be processed by a touch controller 104 that may be separate from other controllers used the display of content. In some embodiments, the touch controller 104 functions may be implemented by a display controller. In some embodiments, touch controller 104 may be an embedded component of an individual display device 111, such that IHS 100 may support multiple distinct touch controllers 104, each processing inputs from a separate display device 111, such as integrated touch controllers 104 processing inputs from separate display panels of a laptop IHS. As described in additional detail below, embodiments may support diagnostic evaluation of such touchscreen user inputs supported by a touch controller 104. In particular, embodiments may support operations diagnosing ghost inputs and stuck conditions detected in touchscreen inputs registered by touchscreen display 111 while the user is not in proximity to the IHS.

Chipset 102 may also provide access to one or more user input devices, in some instances using one or more I/O controller(s) 106 or the like. Examples of user input devices include, but are not limited to touchpad 114A (such as a touchpad integrated in the palm rest area of a laptop IHS), keyboard 114B and mouse 114C. In some embodiments, a single controller may support multiple of these user input devices, such as a keyboard controller that detects inputs from the keyboard 114B and also detects inputs from a touchpad 114A integrated in the palm rest, and also detects mouse 114C inputs detected by buttons included on or under a palm rest of an laptop IHS 100. As described in additional detail below, embodiments may support diagnostic evaluation of inputs received from touchpad 114A, keyboard 114B and mouse 114C. In particular, embodiments may support operations diagnosing ghost inputs and stuck conditions registered as inputs by each of these particular user input devices while the user is not in proximity to the IHS. In some embodiments, other user input devices supported through the operation of I/O controller(s) 106 may include a stylus, microphone(s) and camera(s) that may each be integrated or external components of an IHS 100.

Some IHS 100 embodiments may utilize an embedded controller 109 that may be a motherboard component of IHS 100 and may include one or more logic units. In certain embodiments, embedded controller 109 may operate from a separate power plane from the main processors 101 of IHS, and thus from the operating system functions of IHS 100. In some embodiments, firmware instructions utilized by embedded controller 109 may be used to operate a secure execution environment that may include operations for providing various core functions of IHS 100, such as power management and management of certain operating modes of IHS.

For instance, embedded controller 109 may implement operations for interfacing with a power supply unit (PSU) 112 in managing power for IHS 100. In certain instances, the operations of embedded controller may determine the power status of IHS 100, such as whether IHS 100 is operating strictly from battery power, whether any charging inputs are being received by power supply unit 112, and/or the appropriate mode for charging the one or more battery cells of the IHS using the available charging inputs. Embedded controller 109 may support routing and use of power inputs received via a USB port and/or via a power port supported by the power supply unit 112. In addition, operations of embedded controller 109 may interoperate with power supply unit 112 in order to provide battery status information, such as the state of charge of the battery.

In some embodiments, embedded controller 109 may also implement operations for detecting certain changes to the physical configuration of IHS 100 and managing the modes corresponding to different physical configurations of IHS 100. For instance, where IHS 100 is a laptop computer or a convertible laptop computer, embedded controller 109 may receive inputs from a lid position sensor that may detect whether the two sides of the laptop have been latched together, such that the IHS is in a closed position. In response to lid position sensor detecting latching of the lid of IHS 100, embedded controller 109 may initiate operations for shutting down IHS 100 or placing IHS in a low-power mode. In this manner, IHS 100 may support the use of various power modes.

In managing the operation of IHS 100 according to its physical posture, embedded controller 109 may identify any number of IHS physical postures, including, but not limited to: laptop, stand, tablet, or book postures. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

IHS 100 may include a wide variety of sensors 110 for use in gathering telemetry data that can be used in the management of operations by the IHS. Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s). Sensors 110 may include geo-location sensors capable for providing a geographic location for IHS 100, such as a GPS sensor or other location sensors configured to determine the location of IHS 100 based on triangulation and network information. Various sensors, such as optical, infrared and sonar sensors, may be used in the detection of individuals in proximity to the IHS 100. As described in additional detail below, such user presence detection capabilities may be used in triggering diagnostic monitoring and evaluation of inputs that are registered by user inputs devices of the IHS.

In some embodiments, user presence determinations may be based on collected data collected by sensors 110, where the user presence determinations may be calculated by sensor hub 108 of the IHS. Sensor hub 108 may include AI capabilities designed to consolidate and to process information received from sensors 100 and from other components of the IHS in order to make a variety of status determination and may provide such status determinations to the OS and/or other applications operating on IHS 100. In collecting data, sensor hub 108 may operate General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from a variety of inputs (e.g., sensors 110, cameras, microphones, I/O devices, etc.).

In some embodiments, sensor hub 108 may utilize data from inertial movement sensors, that may include accelerometer, gyroscope, and magnetometer sensors, to determine the current orientation and any movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub 108 may also include capabilities for determining a location and movement of IHS 100 based on triangulation of network signal and based on network information provided by the OS or by a network interface. In some embodiments, the sensor hub 108 may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing an integrated display of the IHS.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
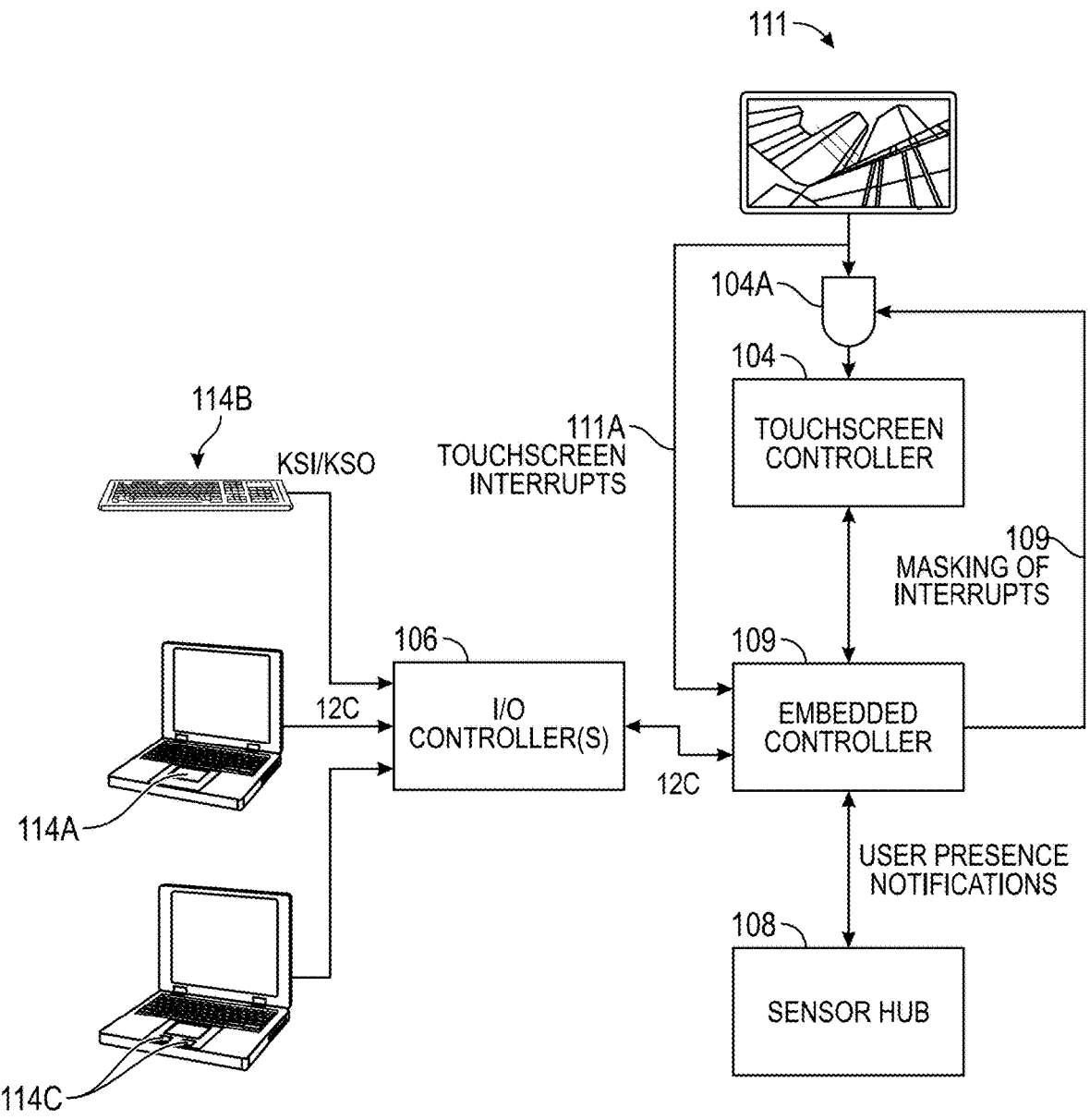
FIG. 2 is a diagram illustrating additional examples of components of an Information Handling System (IHS) configured, according to some embodiments, to support diagnostics of user input devices coupled to the IHS.

FIG. 2 is a diagram illustrating additional examples of components of an Information Handling System (IHS) configured, according to some embodiments, to support diagnostics of user input devices that are coupled to the IHS. As in FIG. 1, the portion of IHS illustrated in FIG. 2 is operated through user input devices that include a touchscreen display device 111, touchpad 114A, keyboard 114B and mouse 114C. User inputs that are registered by touchpad 114A, keyboard 114B and mouse 114C are reported to one or more I/O controller(s) 106, where a respective I/O controller may then report the registered inputs to the operating system, or to other processes and/or components of the IHS. Similarly, user inputs that are registered by a touchscreen display 111 are reported to a touch controller 104 that may then notify the operating system of the detected touchscreen user inputs.

As described above, such user input devices 111, 114A-C may register inputs despite the user not being in physical proximity to the IHS. Such inputs may include "ghost" inputs resulting from events such as pets, children or objects (e.g., garment, cushion, pillow) making contact with the IHS in a manner that results in an input being registered by one or more of the user input devices 111, 114A-C. Such inputs may results in a single input being registered, or may result in a continuous or periodic stream of inputs being registered as inputs. Also as described, such continuous or periodic streams of detected inputs may result from faults associated with user input devices, such as keys stuck in ON states resulting from malfunctions or from debris that is lodged in a manner that results in a key or other button failing to reset to an OFF state.

Figure 3:
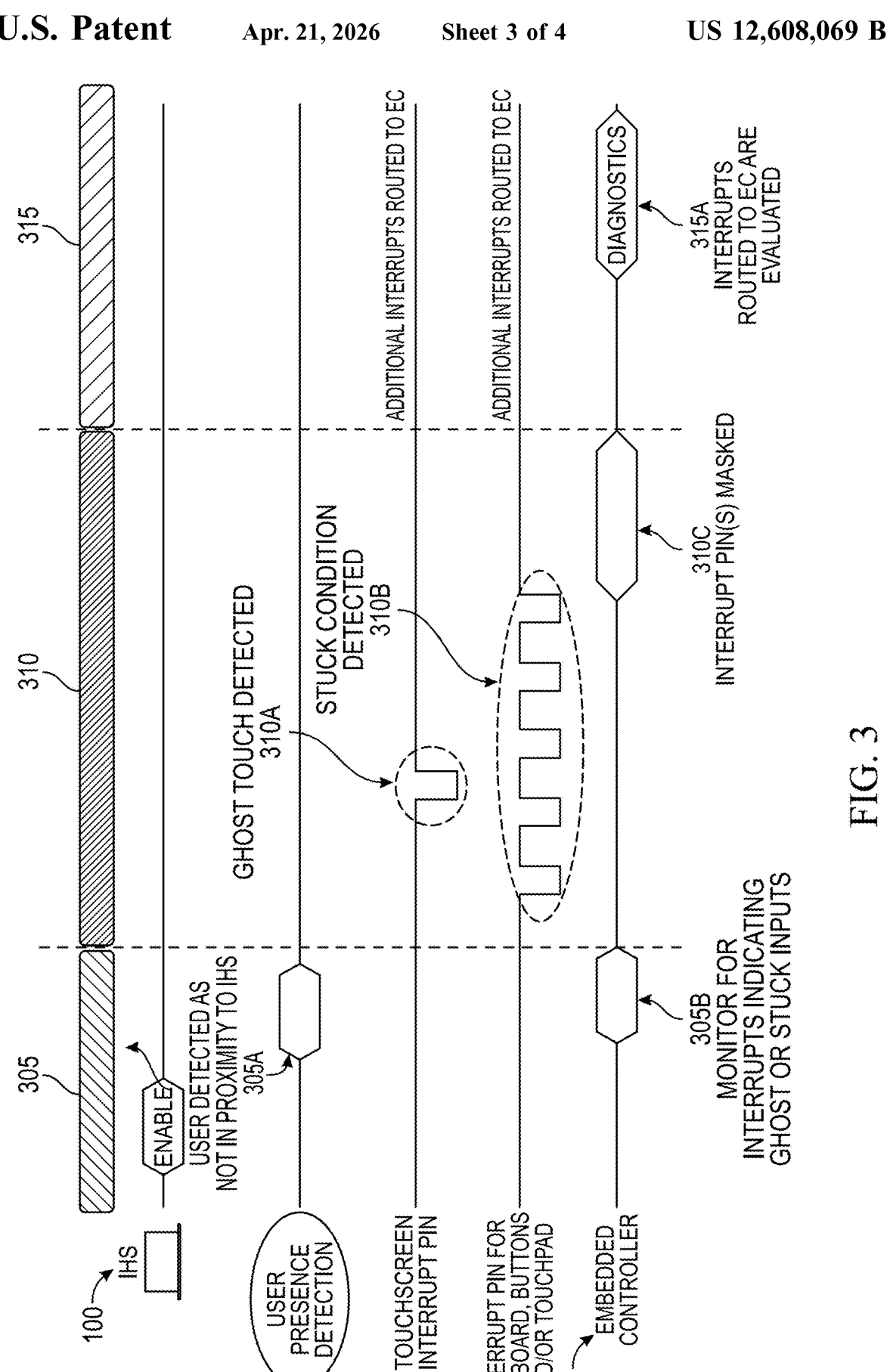
FIG. 3 is a state transition diagram illustrating the operation of a system, according to some embodiments, that provides diagnostics of user input devices coupled to an IHS.

FIG. 3 is a state transition diagram illustrating the operation of a system, according to some embodiments, that provides diagnostics of user input devices coupled to an IHS. In FIG. 3, during the initial interval 305, IHS 100 enables user presence detection capabilities that are then used to trigger procedures for monitoring for ghost inputs and stuck user inputs in user input devices of the IHS. In the evaluation of such occurrences, embodiments initiate diagnostic operations on individual user input devices 111, 114A-C upon detecting inputs registered by user input devices even though the user is not in proximity to the IHS, or at least not in sufficiently close proximity to manually enter inputs to the user input devices. In providing such capabilities, embedded controller 109 may receive, at 305a of interval 305, user presence notifications from sensor hub 108. In some embodiments, such user presence determinations are made based on a synthesis of available sensor 110 and other telemetry (e.g., audio and video data) by sensor hub 108. As described in additional detail below, upon receiving notification of such determinations that the user is no longer detected in proximity to the IHS, the embedded controller 109 may initiate procedures, at 305b, that monitor for inputs detected by user input devices 111, 114A-C despite the user not being in proximity to the IHS.

During interval 310, upon detecting such inputs 310a, 3101b while the user is not in proximity to the IHS, the embedded controller 109 may initiate diagnostic procedures on these user input devices 111, 114A-C. In some embodiments, these diagnostic procedures include, at 310c, the embedded controller 109 masking interrupts generated by the user input devices that have registered inputs despite the user not being in proximity to the IHS. In masking interrupts generated by a user input device that has registered such an input, the embedded controller 109 may route interrupts generated by this user input device such that these interrupts are instead delivered only to the embedded controller. As indicated in FIG. 2, some of the user input devices that support diagnostics according to embodiments may include a logic gate that is usable by the embedded controller 109 in masking and re-routing interrupts generated by a respective user input device during a diagnostics interval 315.

In this embodiment of FIG. 2, such a logic gate 104a is positioned between the touchscreen display 111 and the touchscreen controller 104. During normal operations, interrupts generated by the touchscreen display 111 as a result of a user input being registered by the touchscreen are delivered to the touch controller 104. Upon further processing by the touch controller 104, the touch interrupt may be delivered to the operating system and/or to other components of the IHS. Upon entering a diagnostic interval 315, the embedded controller 109 asserts a signal, at 310c, on signaling pathway 109a that is an input to logic gate 104a, thus resulting in the masking of interrupts generated by the touchscreen display 111.

When masked during the diagnostic interval 315, interrupts that are registered by the touchscreen display 111 are routed, at 315a, to embedded controller 109 via signaling pathway 111a instead of being delivered to touchscreen controller 104. Configured in this manner, interrupts registered by touchscreen display 111 do not reach touch controller 104, and thus do not reach processor 101 and/or the operating system of the IHS. When masked, these interrupts can no longer impact ongoing operations of the IHS, such as providing unwanted inputs to applications running in the operating system of the IHS.

With the interrupts generated by touchscreen display 111 masked in that manner, the interrupts routed to the embedded controller 109 may be utilized in diagnosing whether the inputs being detected by a touchscreen are spurious events that require no further action by the user, or whether the inputs detected by the touchscreen are the result of a stuck condition or other fault in a user input device. As described in additional detail below, the results of such diagnostics may be reported to the user upon returning to the IHS. These diagnostic reports may notify the user of detected inputs and the masking of these inputs while the user was not in proximity to the IHS. These diagnostic reports may also notify they user of detected faults, such as user input devices that are in a stuck condition.

In the embodiment of FIG. 2, logic gate 104a is positioned between touchscreen display 111 and touch controller 104, thus preventing delivery of interrupts to the touch controller 104 during the diagnostic interval 315 initiated by embedded controller 109. In some embodiments, logic gate 104a may instead be positioned between touch controller 104 and processor(s) 101 of IHS 100, thus preventing interrupts from reaching the processors and operating system during the diagnostic interval 315 initiated by embedded controller 109. In the embodiment of FIG. 2, only a single logic gate 104a is illustrated. In some embodiments, similar logic gates may be positioned between some or all of the user input devices 114A-C and their respective controllers. For instance, a logic gate positioned between keyboard 114B and a keyboard controller may be utilized by the embedded controller 109 in masking interrupts generated by the keyboard during the diagnostic interval 315 initiated by the embedded controller 109.

FIG. 4 is a flowchart illustrating an example of a method, according to some embodiments, for supporting diagnostics of user input devices that are coupled to an IHS. Embodiments may begin, at 405, with the initialization of an IHS 100, such as upon booting or restarting the IHS. In some embodiments, upon initialization of an IHS, instructions to be loaded for use by hardware components of the IHS, such as firmware and other settings, may be validated as authentic based on comparisons of the instructions to be loaded against reference signatures corresponding to authentic instructions. Upon successful validation of such instructions, one or more of the hardware components of the IHS 100 may load validated instructions and may thus operate based on execution of these trusted instructions. In embodiments, this validated firmware to be loaded by components of the IHS 100 may include firmware for use by the embedded controller in providing diagnostic operations on user inputs devices of the IHS.

Once firmware instructions for use in embodiments have been validated, at 410, further initialization may include initiating the IHS 100 boot sequence and loading operating system instructions. Once a requisite amount of instructions have been loaded and the IHS is in operation, at 415, embodiments may initiate operation of collection of telemetry, such as from sensors 110 for use in the detection of individuals in proximity to the IHS, including determining the location of an individual relative to the IHS. In some embodiments, at 420, user presence detection may be initiated as a background process that tracks sensor 110 telemetry and other sources of information that may be indicative of an individual being located in proximity to the IHS. In some embodiments, a sensor hub 108 may interface with one or more sensors and other sources of information (e.g., cameras, infrared sensors, time-of-flight sensors, microphones, etc.) in monitoring for the presence of individuals in proximity to the IHS 100.

With the user presence detection initiated, the IHS 100 is put into operation with the user operating applications provided via the operating system of the IHS. The IHS 100 may be operated for any amount of time when, at 425, embodiments determine the user is no longer in proximity to the IHS. In some instances, user presence detection capabilities of the IHS 100 may determine that the user is no longer in close proximity to the IHS, but is nonetheless in the same area of the IHS, such as within the same room. In some embodiments, the user presence detection capabilities of the IHS 100 may be used to determine a likelihood that the user is in close enough proximity to the IHS to physically enter inputs to the IHS, such as keyboard, mouse, trackpad and/or touchscreen inputs by the user.

Once the user is not detected as being in proximity to the IHS, or the user is determined to be located at a distance that prevents manual inputs to the IHS, at 430, embodiments may initiate monitoring of user inputs devices of the IHS. In some embodiments, monitoring of these user input devices may be implemented by embedded controller 109, where the embedded controller may interface with one or more I/O controllers 104, 106 of the IHS 100 in monitoring for inputs registered by these user input devices. For instance, as described above, embedded controller 109 may interface with a touch controller 104 in monitoring for detected touchscreen inputs and/or may interface with an I/O controller 106 in monitoring for inputs detected by other user input devices, such as a keyboard 114B, touchpad 114A and/or mouse 114C. In some embodiments, embedded controller 109 may interface with these controllers of IHS 100 via sideband management pathways used by the embedded controller in providing remote management of hardware of the IHS.

Through such monitoring capabilities, embedded controller 109 may detect an interrupt signal that is generated by any one of the managed user inputs devices of IHS 100. As described above, in some instances, embedded controller 109 may detect interrupts generated by user input devices directly through monitoring of signaling pathways used by the respective user input devices. Other interrupts may be detected indirectly by the embedded controller 109, such as based on notifications provided by controllers 104, 106 that are configured according to embodiments. As described above, such device interrupts may results in a variety of unwanted operations by the IHS 100. For instance, in response to such interrupts, ongoing execution of applications may be halted, including operations initiated by the user prior to leaving the IHS 100. These device interrupts may also result in unwanted inputs to user applications and/or operating system applications, such as unintentionally waking the IHS from a low-power mode.

In response to detecting such inputs despite the user not being in proximity to the IHS 100, at 440, embodiments may mask interrupt signals generated by some or all of the user input devices of the IHS. As described above, in some embodiments, the signaling pathways used by some or all of the user input devices of the IHS may include a configurable logic gate that can be used to route interrupt signals generated by a respective user input device to the embedded controller 109, thus masking these detected inputs from the processor(s) 101 of the IHS, and also from the operating system of the IHS. As such, once user device input interrupt signals have been detected despite the user not being in proximity to the IHS 100, embodiments may mask such inputs from affecting operations of the IHS, while still capturing these inputs for diagnostic analysis by the embedded controller.

Accordingly, in some embodiments, at 445 and during diagnostic interval 315, embodiments may display a notification that diagnostic operations are being performed on specific user input devices of the IHS. While interrupts of a user input device are being masked, any additional user inputs that are registered during this interval will not result in responsive operations by the IHS, and in particular will not result in unwanted response by the operating system of the IHS. As such, embodiments may display a visual notification on some or all of the display devices 111 of the IHS indicating the specific user input devices that are currently subject to diagnostic operations and thus will not respond normally to any inputs from the user, thus indicating to the user that user input devices are not broken and are instead in a diagnostic mode of operations.

While the interrupts from the user input devices are masked, at 450, these interrupt signals and any inputs captured by the devices are routed to the embedded controller 109. With the interrupts routed in this manner, the user input devices are not disabled but are instead reconfigured to direct any registered inputs to the embedded controller 109. At 455, based on the interrupts and other inputs detected during the diagnostic interval 315, the embedded controller 109 evaluates the masked interrupts and other inputs for determining whether they result from ghost inputs, or from stuck or otherwise malfunctioning inputs supported by a device. As described, ghost inputs may be the result of spurious events that cause singular inputs to be registered by the IHS, such as a result of something other than the user contacting a touchpad of the IHS. Other ghost inputs may result in repeated inputs to the IHS, such as due to a pet or other child making repeated or continuous contact with a input device of the IHS. Also as described, continuous interrupts detected during an interval 315c while the user is not in proximity to the IHS may provide an indication of a failure or malfunction of a user input device, such as a mouse input or keyboard entry that is in a stuck position, thus generating an always on or repeating interrupt by the device.

Based on these evaluations by embedded controller 109, embodiments may determine whether detected inputs are spurious events that can be ignored, or whether a malfunction such as a stuck input has occurred, thus compromising the usable capabilities of a respective user input device. Monitoring and evaluation of the masked inputs may continue for any amount of time until, at 460, the user is again detected in proximity to the IHS 100. During the diagnostic interval 315, the presence detection capabilities of the IHS 100 continue to monitor telemetry for indications that the user is returning to the IHS, or at least is returning to the proximity of the IHS.

Once the user is again detected in proximity to the IHS 100, at 465, embodiments may notify the user of the diagnostics performed on the user input devices, such as via a graphical user interface presented in display 111. In some embodiments, the diagnostic notification may include a report of ghost inputs that were registered by each of the user input devices during the interval while the user was not in proximity to the IHS. In some embodiments, the diagnostic notification may specify that a user input device has an input that is in a stuck condition. For instance, the notification may inform the user that a specific key of a keyboard 114B, a mouse 114C button or touchscreen location is stuck in an ON state. In some scenarios, such stuck inputs may otherwise very difficult for a user to diagnose without the use of embodiments. For instance, a stuck control key or num lock key of keyboard may result in responses by the IHS to user inputs that are likely confusing and erroneous.

Upon providing the user with such notifications, at 470, embodiments may unmask the interrupt pins of the user input devices that were subject to the diagnostic operations. If no stuck conditions or other faults have been identified, the unmasking of the interrupts of the user input devices may result in no further action as the user resumes operation of the IHS 100 and embodiments continue, at 420, to monitor for user presence determinations that indicate the user has again moved away from the IHS, at which time monitoring resumes for ghost inputs or other inputs while the user is not in proximity to the IHS. In scenarios where ghost inputs are reported to the user, the user may use this reported information to further investigate the source of these inputs, such as inputs resulting from pets or children that may not be recognized by the presence detection capabilities of the IHS, inputs resulting from items coming in contact with the IHS (such as items moved by wind or items falling on the IHS) and inputs resulting from the IHS falling or otherwise moving (such as laptop shifting on the couch in a manner that results in inputs). In all such scenarios, embodiments provide a user with information usable to diagnose failing user input devices and to distinguish those scenarios from other ghost input scenarios that may result from the IHS receiving inputs from sources other than the user while the user is not in proximity to the IHS. Moreover, embodiments additionally provide diagnostics that identify failing or faulty user input devices, thus allowing the user to replace or repair these user input devices without requiring further investigation by the user.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for diagnostic operations on user input devices of an Information Handling System (IHS), the method comprising:
    determining whether a user is in proximity to the IHS;
    in response to determining that the user is not in proximity to the IHS, monitoring for inputs detected by one or more of the user input devices of the IHS;
    in response to the monitoring detecting an input at a first user input device while the user is not in proximity to the IHS, initiating diagnostics to identify whether the detected input is a spurious event or results from a fault in the first user input device; and
    in response to determining the user is in proximity to the IHS, exiting the diagnostics and reporting faults identified by the diagnostics.

2. The method of claim 1, wherein the determining that the user is not in proximity to the IHS comprises determining that the user is too far from the IHS to provide inputs to the one or more user input devices.

3. The method of claim 1, wherein the determining the user is in proximity to the IHS is based on telemetry collected from one or more sensors of the IHS.

4. The method of claim 1, wherein the user input devices comprise at least one of: a touchpad, a touchscreen, a keyboard and a mouse.

5. The method of claim 1, wherein the diagnostics comprise masking interrupts generated by the first user input device while the user is not in proximity to the IHS.

6. The method of claim 5, wherein the masking of interrupts generated by the first user input device while the user is not in proximity to the IHS comprises routing of the interrupts to an embedded controller of the IHS.

7. The method of claim 6, wherein the masked interrupts that are routed to the embedded controller are not received by a system processor of the IHS.

8. The method of claim 6, wherein the embedded controller implements the diagnostics that identify whether the detected input is a spurious event or results from a fault in the first user input device.

9. The method of claim 8, wherein the embedded controller identifies whether the detected input results from a fault in the first user input device by determining an input of the first input device is in a stuck state.

10. The method of claim 9, wherein the embedded controller determining an input of the first input device is in a stuck state based on the inputs detected in the masked interrupts routed to the embedded controller.

11. The method of claim 8, wherein the embedded controller identifies whether the detected input is a spurious event based on the input not reoccurring in the masked inputs routed to the embedded controller.

12. The method of claim 1, further comprising notifying the user of the diagnostics initiated on the first user input device.

13. An Information Handling System (IHS) comprising:
    a plurality of user input devices;
    one or more processors; and
    one or more memory devices coupled to the one or more processors, the memory devices storing computer-readable instructions that, upon execution by the one or more processors, cause the IHS to:
        determine whether a user is in proximity to the IHS;
        in response to determining that the user is not in proximity to the IHS, monitor for inputs detected by one or more of the user input devices of the IHS;
        in response to the monitoring detecting an input at a first user input device while the user is not in proximity to the IHS, initiate diagnostics to identify whether the detected input is a spurious event or results from a fault in the first user input device; and
        in response to determining the user is in proximity to the IHS, exit the diagnostics and report faults identified by the diagnostics.

14. The IHS of claim 13, wherein the user input devices comprise at least one of: a touchpad, a touchscreen, a keyboard and a mouse.

15. The IHS of claim 13, wherein the diagnostics comprise masking interrupts generated by the first user input device while the user is not in proximity to the IHS.

16. The IHS of claim 15, wherein the masking of interrupts generated by the first user input device while the user is not in proximity to the IHS comprises routing of the interrupts to an embedded controller of the IHS.

17. The IHS of claim 16, wherein the masked interrupts that are routed to the embedded controller are not received by a system processor of the IHS.

18. A non-transitory computer-readable medium having instructions stored thereon for diagnostics of user input devices of an IHS (Information Handling System), wherein execution of the instructions by one or more processors of the IHS causes the IHS to:

determine whether a user is in proximity to the IHS;

in response to determining that the user is not in proximity to the IHS, monitor for inputs detected by one or more of the user input devices of the IHS;

in response to the monitoring detecting an input at a first user input device while the user is not in proximity to the IHS, initiate diagnostics to identify whether the detected input is a spurious event or results from a fault in the first user input device; and in response to determining the user is in proximity to the IHS, exit the diagnostics and report faults identified by the diagnostics.

19. The computer-readable storage device of claim 18, wherein the user input devices comprise at least one of: a touchpad, a touchscreen, a keyboard and a mouse.

20. The computer-readable storage device of claim 18, wherein the diagnostics comprise masking interrupts generated by the first user input device while the user is not in proximity to the IHS.

* * * * *